(12) United States Patent
Xie et al.

(10) Patent No.: US 9,150,735 B2
(45) Date of Patent: Oct. 6, 2015

(54) SUPERHYDROPHILIC AND WATER-CAPTURING SURFACES

(75) Inventors: Xian Ning Xie, Singapore (SG); Kian Ping Loh, Singapore (SG)

(73) Assignee: National University of Singapore, Singapore (SG)

( * ) Notice: Subject to any disclaimer, the term of this patent is extended or adjusted under 35 U.S.C. 154(b) by 34 days.

(21) Appl. No.: 13/522,636

(22) PCT Filed: Jan. 14, 2011

(86) PCT No.: PCT/SG2011/000019
§ 371 (c)(1),
(2), (4) Date: Jul. 17, 2012

(87) PCT Pub. No.: WO2011/087458
PCT Pub. Date: Jul. 21, 2011

(65) Prior Publication Data
US 2013/0003258 A1  Jan. 3, 2013

Related U.S. Application Data

(60) Provisional application No. 61/294,865, filed on Jan. 14, 2010.

(51) Int. Cl.
*H01G 9/00* (2006.01)
*C09D 5/24* (2006.01)
*C09D 125/18* (2006.01)
*H01G 11/38* (2013.01)
*C09K 3/18* (2006.01)
*H01G 11/36* (2013.01)

(52) U.S. Cl.
CPC ............... *C09D 5/24* (2013.01); *C09D 125/18* (2013.01); *H01G 11/38* (2013.01); *H01G 11/36* (2013.01); *Y10T 428/265* (2015.01)

(58) Field of Classification Search
CPC ....... H01G 9/155; H01G 9/058; H01G 9/016; Y02E 60/13; Y02T 10/7022
USPC .......................................................... 361/502
See application file for complete search history.

(56) References Cited

U.S. PATENT DOCUMENTS

| | | | | |
|---|---|---|---|---|
| 5,536,573 | A * | 7/1996 | Rubner et al. | 428/378 |
| 2005/0053801 | A1 * | 3/2005 | Elschner et al. | 428/690 |
| 2005/0111165 | A1 * | 5/2005 | Merker et al. | 361/525 |
| 2009/0250665 | A1 * | 10/2009 | Hsu et al. | 252/500 |

* cited by examiner

*Primary Examiner* — Jenny L Wagner
*Assistant Examiner* — Michael P McFadden
(74) *Attorney, Agent, or Firm* — Cesari and McKenna, LLP

(57) ABSTRACT

A coated substrate includes a substrate and a coating containing a water insoluble polymer and a water soluble polymer, the two polymers, due to different water affinity, forming a nanosegregant on the substrate. Also disclosed are a method of preparing the above-described coated substrate and the use of this coated substrate in a solid-state supercapacitor.

20 Claims, 2 Drawing Sheets

SUPERHYDROPHILIC AND WATER-CAPTURING SURFACES

CROSS-REFERENCE TO RELATED APPLICATIONS

This application is the National Stage of International Application No. PCT/SG2011/000019, filed on Jan. 14, 2011, which claims the benefit of the priority date of U.S. Provisional Patent Application No. 61/294,865, filed Jan. 14, 2010. The content of these applications is hereby incorporated by reference in its entirety.

BACKGROUND OF THE INVENTION

Typically, superhydrophilic surfaces have a water contact angle of less than 25° and water-capturing surfaces retain water as a uniform film having a thickness of millimeters.

Many techniques have been developed to prepare superhydrophilic surfaces. See I. P. Parkin et. al., *J. Mater. Chem.* 2005, 15, 1689. For example, superhydrophilic surfaces are obtained by UV-irradiation of oxide semiconductor films such as $TiO_2$ and ZnO. In this method, the superhydrophilicity, induced by photon-generated short-lived charges, gradually disappears without continuous UV illumination. See, e.g., X. M. Li et. al., *Chem. Soc. Rev.* 2007, 36, 1350, A. Lafuma et. al., *Nat. Mater.* 2003, 2, 457.

A method has been devised for producing water-capturing surfaces that mimic the water harvesting wing surfaces of the Namib Desert beetle. See L. Zhai, *Nano Lett.* 2006, 6, 1213. This method is not suitable for large-scale production as it involves layer-by-layer multi-step patterning and deposition of both hydrophilic and hydrophobic components.

Of note, superhydrophilic surfaces do not necessarily possess water-capturing capacity.

Surfaces that are superhydrophilic and/or water-capturing have many industrial applications. Superhydrophilicity prevents fog formation, as condensed water spreads across a superhydrophilic surface. On the other hand, water-capturing surfaces can used to draw water from dew in arid areas. A surface that possesses both superhydrophilicity and water-capturing capacity is ideal for use in a solid-state supercapacitor.

There is a need for cost-efficient methods of preparing enduring superhydrophilic and/or water-capturing surfaces.

SUMMARY OF THE INVENTION

One aspect of this invention relates to a coated substrate having a surface that possesses both superhydrophilicity and water-capturing capacity. The coated substrate includes (i) a coating having a water insoluble polymer and a water soluble polymer, and (ii) a substrate covered by the coating.

The two polymers, due to their different water affinity, form a nanosegregant having a thickness of 1-10 nm (e.g., 1-5 nm). More specifically, in the nanosegregant, the water insoluble polymer adheres onto the substrate and the water soluble polymer adheres onto the adhered water insoluble polymer. The nanosegregant has a water contact angle of 0-25° (e.g., 5-20°) and a capability to capture a water film having a thickness of 0.1-10 mm (e.g., 0.5-3.0 mm).

The coating can further include, on top of the nanosegregant, a conductive non-nanosegregant film containing the same water soluble polymer and the same water insoluble polymer. Unlike the nanosegregant, this film, having a thickness of 0.4-500 μm, does not exhibit either superhydrophilicity or water-capturing capacity.

The water soluble polymer contains identical or different hydrophilic and hygroscopic groups, e.g., carboxylic groups or sulfonic groups. An example of such a water soluble polymer is poly(styrene sulfonic acid) ("PSSH"). The water insoluble polymer, on the other hand, contains identical or different electrically conductive groups, e.g., aniline groups or thiophene groups. An example of such a water insoluble polymer is poly(3,4-ethelynedioxythiophene ("PEDT"). In one embodiment of the above-described coated substrate, PSSH and PEDT are used as a water soluble polymer and a water insoluble polymer, respectively, at a ratio of 2.5:1 to 20:1 by weight (e.g., 6:1 by weight).

Another aspect of this invention relates to a method of preparing the coated substrate depicted above. The method includes at least three steps: (i) providing an aqueous dispersion containing a water soluble polymer and a water insoluble polymer, (ii) applying the aqueous dispersion onto a surface of a substrate, and (iii) allowing the applied aqueous dispersion to dry to form on the surface of the substrate a nanosegregant, due to different water affinity of the two polymers. The excess applied polymers form a non-nanosegregant film, which is mentioned above. The method can further include, after step (iii), a step of removing the excess applied polymers to expose the nanosegregant.

The coated substrate of this invention can be a positive electrode having a coating that includes both a nanosegregant and a non-nanosegregant film. This coated positive electrode can be used to make a solid-state supercapacitor. Such a solid-state supercapacitor includes (i) a positive electrode, (ii) a negative electrode, (iii) a nanosegregant, as described above, formed from an aqueous dispersion that contains an ionizable water soluble polymer and a water insoluble polymer due to their different water affinity of the two polymers, and (iv) a conductive film, as described above, containing the water soluble polymer and the water insoluble polymer. The nanosegregant is disposed between the positive electrode and the film, and the film is disposed between the negative electrode and the nanosegregant.

The details of one or more examples of the invention are set forth in the description below. Other features, objects, and advantages of the invention will be apparent from the detailed description of the examples and also from the drawings and the appending claims.

BRIEF DESCRIPTION OF THE DRAWINGS

The drawings are first described.

DETAILED DESCRIPTION OF THE INVENTION

Figure 1:
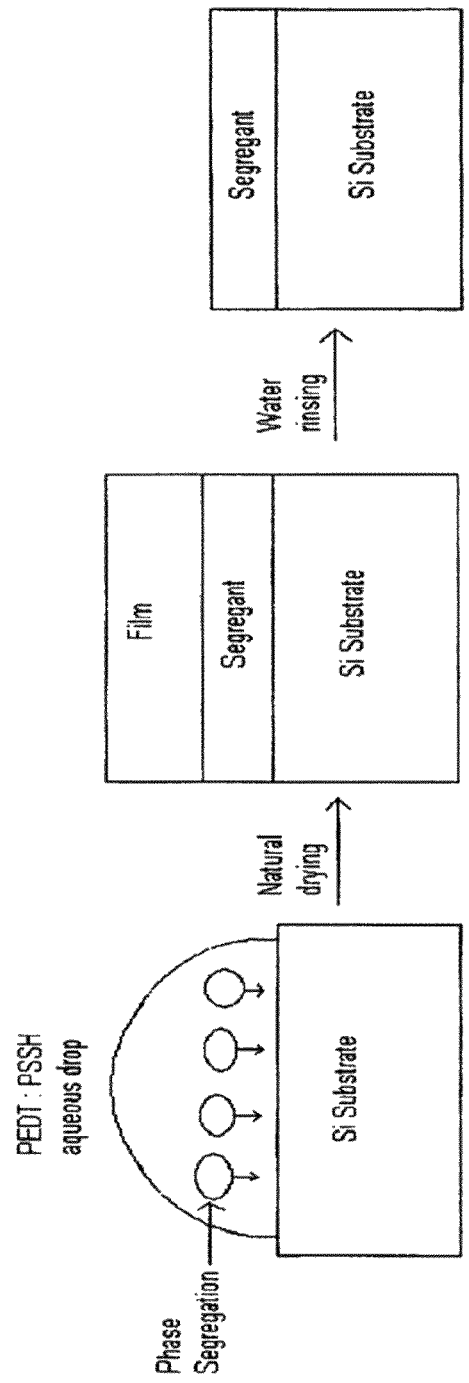
FIG. 1 is a schematic diagram illustrating a process of preparing a superhydrophilic and water-capturing surface.

Within the scope of this invention is a substrate having a coating made of a water soluble polymer and a water insoluble polymer. The coating includes a nanosegregant (with a thickness of 1-10 nm) containing the two polymers and, optionally a conductive non-nanosegregant film (with a thickness of 0.4-500 μm) also containing the two polymers. The nanosegregant unexpectedly exhibits both superior superhydrophilicity and superior water-capturing capacity.

The substrate can be a metal, an insulator, a semiconductor, a polymer, or a combination thereof. Examples of a metal include gold, silver, copper, iron, aluminum, lead and alloy (i.e., stainless steel). Examples of an insulator include $SiO_2$, wood, porcelain, clay, alumina, silicon, and paper. Examples of a semiconductor include silicon, silicon carbide, gallium arsenide, silicon nitride, indium sulfide, zinc oxide, and diamond. Examples of a polymer include PVC, Teflon, polycarbonate, polyester, nitrocellulose, polyethersulfone, and polypropylene.

To prepare a coated substrate of this invention, one applies onto the surface of a substrate an aqueous dispersion including a water soluble polymer and a water insoluble polymer. An artisan can mix the two polymers in water to obtain this dispersion, or purchase it from a commercial supplier.

The term "water soluble polymer" refers to a polymer that contains identical or different hydrophilic and hygroscopic groups (e.g., carboxylic groups and sulfonic groups), which make the polymer soluble or dispersible in water. Each of the groups can exist in the form of an acid (e.g., carboxylic acid and sulfonic acid), or in the form of a salt (e.g., carboxylate and sulfonate). Note that when the water soluble polymer is used to prepare a supercapacitor as discussed below, such a polymer must also be ionizable.

The term "water insoluble polymer" refers to a conductive polymer that does not contain ionizable or strong polar groups, but contains identical or different electrically conducting groups (e.g., aniline groups and thiophene groups). Each of the groups can exist in the form of an unsubstituted group (e.g., aniline and thiophene), or in the form of a substituted group (e.g. substituted aniline and substituted thiophene).

It is critical that the two polymers can be well dispersed in water as nanoparticles (e.g., a diameter of 20-120 nm) so as to form an aqueous dispersion.

The ratio between the water soluble polymer and the water insoluble polymer varies. It affects the properties of the nanosegregant and the film prepared from the two polymers, e.g., superhydrophilicity, conductivity, and water-capturing capacity.

One can apply the aqueous dispersion onto a substrate by drop-casting. Other methods include, but are not limited to, spin coating, spray coating, roller coating, flow coating, roll-to-roll coating, and electrospinning.

Once an aqueous dispersion has been applied onto a substrate, it is left to dry. During this process, the water soluble polymer and the water insoluble polymer undergo phase segregation. As a result, a nanosegregant forms on top of the substrate and a conductive non-nanosegregant film forms on top of the nanosegregant. The conductive film can be washed away to expose the nanosegregant. Due to the intermolecular reorganization, the nanosegregant adheres strongly to the substrate surface.

It has been found that nanosegregants formed on various substrates remain on the substrates surfaces even after boiling in water or other common solvents.

The phase segregation is driven by the different water affinity of the water soluble polymer and the water insoluble polymer. The two polymers segregate themselves on the substrate surface to reach a thermodynamic equilibrium in order to minimize the Gibbs free energy of the whole system.

The nanosegregant thus formed, not soluble in water, has a thickness of 1-10 nm. Optionally, it also has a nanometer length and a nanometer width, e.g., 20-150 nm. These dimensions can be measured by an atomic force microscope (AFM). See X. N. Xie, et. al., *Macromol. Chem. Phys*, 2010, 211, 2187. It exhibits two unexpected superior features. First, it transforms various substrate surfaces into superhydrophilic surfaces with water contact angles of 0-25°, regardless of the water wettability of the substrate surfaces. Second, the nanosegregant demonstrates a strong water-capturing capacity. With a thickness of nanometers, it is capable of capturing a water film having a thickness of 0.1-10 mm.

In one embodiment, the density of the hydrophilic and hygroscopic groups contained in the water soluble polymer are in the order of $10^{21}$ groups/cm$^3$ in the segregant and the density of the electrically conducting groups contained in the water insoluble polymer are also in the same order.

When PEDT is used as a water insoluble polymer and PSSH is used as a water soluble polymer, the nanosegregant thus formed contains both PEDT and PSSH. The sulfonic acid groups contained in PSSH are distributed on the nanosegregant surface and provide the strong hydration force for water-capturing after the above-described phase segregation. Previous calculations have shown that one sulfonic acid group can capture five water molecules to form a $H_5O_2^+$ hydronium nanocluster. See H. M. Li, et. al., *Polymer International*, 2001, 50, 421-428. The hydronium nanocluster is much more stable than bulk water because the hydrogen bond length of the nanocluster is significantly shorter than that of bulk water. The $H_5O_2^+$ nanocluster forms the first hydration shell surrounding the sulfonic acid group and provides the base for further water uptake through proton delocalization and hydrogen bonding. Thus, a nanometer-thick nanosegregant can transform various substrate surfaces into superhydrophilic surfaces, and it can also capture a water film having a thickness of millimeters.

The conductive non-nanosegregant film contains the same water soluble polymer and the same water insoluble polymer in the nanosegregant. As the two polymers in the film do not undergo phase segregation, the film, does not exhibit either superhydrophilicity or water-capturing capacity. The thickness of the film (0.4-500 µm) can be determined based on measurement by an AFM or surface profiler.

When the above-described coated substrate is used as a positive electrode having a coating that includes both the nanosegregant and the conductive non-nanosegregant film, a negative electrode is attached to the film to form a supercapacitor with an electrode/film/electrode sandwich configuration.

Both the nanosegregant and the water absorbed in the film contribute to the supercapacitive behavior, which can be explained by a nanosegregant-mediated charge storage mechanism. The nanosegregant is superhydrophilic as it is negatively charged, attributable to the ionizable and hygroscopic groups (e.g., $SO_3^-$ sulfonic groups) in the water soluble polymer. The nanosegregant containing immobile hygroscopic groups is surrounded by mobile $H^+$ ions (due to electrostatic interactions), and also by hydration water (due to its superhydrophilicity). When the positive electrode is charged, $H^+$ cations are forced to move through the film towards the negative electrode. At the same time, the absorbed hydration water is dissociated into $H^+$ and $OH^-$ ions by the charging voltage, which move in opposite directions. When the supercapacitor is fully charged, $H^+$ cations accumulate near the negative electrode, while $OH^-$ (and $SO_3^-$) anions are located in the vicinity of the positive electrode. This ionic relocation generates an internal field that holds the positive charge near the negative electrode and the negative charge near the positive electrode, thus achieving charge storage in the supercapacitor.

According to this mechanism, the negatively charged nanosegregant (e.g. $OH^-$ and $SO_3^-$) on the positive electrode dictates that the electrode is positively charged. This is in agreement with the observation that the supercapacitive behavior only takes place on the positive electrode and the influence that small $H^+$ cations can move through the film due to their high mobility in the film. In contrast, negatively charging the electrode coated with a nanosegregant requires the movement of OH⁻ anions through a thick film, which is not favorable due to the poor mobility of OH⁻ anions in the film. The film, which does not contain a nanosegregant, just acts as a typical conducting media for its electronic and ionic conductivity.

The high $C_s$ (e.g., about 65 mF/cm² as shown in an example below) of the supercapacitor is related to the large surface area of the nanosegregant. The nominal surface area of the nanosegregant is estimated to be at least >10³ m²/g. The density of the hygroscopic groups on the nanosegregant surface is also very high, which explains the strong hydration force for the water-capturing behavior. The strong electrostatic field of the nanosegregant generates a large counter-ion (H⁺) zone and attracts thick shells of hydration water. Therefore, the supercapacitive characteristic of the supercapacitor is attributable to the formation of an electric double layer around the nanosegregant under a charging voltage. The absorbed hydration water provides mobile H⁺ cations for charge storage. Thus, the supercapacitive behavior disappears when the absorbed water is removed.

A supercapacitor of the invention can further include in the nanosegregant and the film, a carbon-based nanomaterial that has a high surface area (e.g., 2000 m²/g) and a high electric conductivity (e.g., 10⁴ S/cm). Graphene is an example of such a nanomaterial. Specifically, graphene powders or flakes can be added into an aqueous dispersion of a water soluble polymer and a water insoluble polymer. This aqueous dispersion is then used to form a supercapacitor by the same method described above. The supercapacitor thus prepared exhibits even higher energy storage capacity.

The coated substrate provides numerous other industrial applications, e.g., anti-fogging mirrors and traffic signs, self-cleaning devices and water-harvesting devices.

Without further elaboration, it is believed that one skilled in the art can, based on the disclosure herein, utilize the present invention to its fullest extent. The following specific examples are, therefore, to be construed as merely descriptive, and not limitative of the remainder of the disclosure in any way whatsoever. All publications cited herein are incorporated by reference.

Preparation of Superhydrophilic and Water-Capturing Surfaces

A PEDT:PSSH polymer blend (CLEVIOS™ P, Heraeus Clevios Gmbh, Germany, w/w 1:6), as an aqueous dispersion, was used to prepare superhydrophilic and water-capturing surfaces. In the dispersion, the two polymers form nanoparticles, each having a diameter of 20-110 nm. It had a combined polymer concentration of 1.0-3.0% by weight.

As illustrated in FIG. 1, a PEDT:PSSH aqueous drop was first cast onto the surface of a Si substrate and left to dry at ambient temperature for about 3 hrs. During the drying process, the two polymers formed a PEDT:PSSH nanosegregant on the substrate and a PEDT:PSSH film on top of the nanosegregant. As discussed below, AFM methodology confirmed the formation of both the nanosegregant and the film. The film was then removed by gently rinsing it with deionized water to expose the nanosegregant.

The water contact angles of the Si surface, both bare and nanosegregant-covered, were measured in a manner similar to that described in S. H. Lu, et. al., *Langmuir* 2009, 25, 12806. The water capturing capacity of the nanosegregant was estimated by measuring the average thickness of the absorbed water film. The average thickness was obtained by measuring both the weight of the water captured film and the size of the water captured film. The measurements show that the nanosegregant was superhydrophilic (exhibiting a minimum water contact angle of 8°) and possessed a great water-capturing capacity (retaining a water film as thick as 3.0 millimeters.

When the drying process was expedited, i.e., fast drying in vacuum for several minutes, no nanosegregant could be observed after the film was rinsed off. This indicated the importance of the drying process during the nanosegregant formation. When the PEDT:PSSH aqueous drop was left to dry at ambient temperature for more than 3 hrs, e.g., 4.0 or 5.0 hrs, the superhydrophilicity and water-capturing capacity of the nanosegregant remained about the same.

AFM images revealed that the nanosegregant had a round or elongated shape. The average width and height of the nanosegregant were ~70.0 and ~2.4 nm, respectively. The maximum length of the elongated nanosegregant was ~165 nm. The thickness of the film was determined to be ~1.2 µm based on measurement of the height difference between the film-covered Si surface and the nanosegregant-covered Si surface. The film had the same width and the length as the segregant. See X. N. Xie, et. al., *Macromol. Chem. Phys*, 2010, 211, 2187.

The film was removed by water in seconds. The nanosegregant, on the other hand, remained on the Si substrate after immersion in water for half a year.

S 2p core level spectra were compiled from the film and nanosegregant by using photoelectron spectroscopy (PES) in the manner described in X. N. Xie, et. al., *ACS NANO* 2009, 3, 2722; X. N. Xie, et. al., *Macromol. Chem. Phys*, 2010, 211, 2187.

For the film, there were two peaks located at 163.5 and 167.8 eV. The peak at 163.5 eV arose from the thiophene ring of PEDT, and the peak at 167.8 eV originated from the sulfonic group (R—S(=O)2-OH) of PSSH. See G. Grecaynski, et. al., *Thin Solid Films*, 1999, 354, 129-135.

The S 2p core level spectrum of the nanosegregant also consisted of two peaks corresponding to the PEDT and PSSH. However, the two peaks of the nanosegregant were systematically shifted towards higher binding energy (by ~1.4 eV). This was attributable to the charging of the nanosegregant, as such a shift was also observed in the PES measurement for other core levels including C 1s and Si 2p. The charging phenomenon indicated that the nanosegregant was more insulating than the film.

Other than Si, four additional substrates, i.e., Au, glass, mica and plastic transparency, were also used to prepare a nanosegregant on their surfaces by the same method described above. The water contact angles of bare and nanosegregant-covered substrate surfaces were measured and the measurement results are listed in Table 1 below.

Table 1 below shows that, regardless of water wettability of the surfaces of these substrates, the nanosegregant transformed all of them into superhydrophilic surfaces with water contact angles in the range of 7° to 20°.

TABLE 1

| Substrate | CA of bare surface | CA of nanosegregant-covered surface |
|---|---|---|
| Si | 40° | 8° |
| Au | 65° | 7° |
| Glass | 53° | 12° |
| Mica | 60° | 13° |
| Plastic Transparency | 62° | 20° |

Due to its superhydrophilicity, the nanosegregant showed an anti-fogging effect. A glass substrate with a nanosegregant on its surface was placed above a water boiler that generated water steam. When the water steam condensed onto the glass substrate, it formed a uniform water layer on the nanosegregant-covered surface and droplets on the bare glass surface. In other words, the nanosegregant-covered surface remained transparent and the bare glass surface was foggy.

Other than the superhydrophilic feature, the water-capturing capacity of the PEDT:PSSH nanosegregant was also tested. A Si substrate with a nanosegregant on its surface was dipped into water for a few seconds. A water film, having a thickness of millimeters, was formed exactly where the nanosegregant was located, indicating that the nanosegregant retained a great amount of water. Similar water-capturing behavior was also observed for a nanosegregant on a Au surface. The shape of the nanosegregant was purposely made irregular. After being dipped into water, the nanosegregant captured a water film that had exactly the irregular shape. The other three coated substrates listed in Table 1 also exhibited such water-capturing capacity.

Preparation of Solid-State Supercapacitors

Figure 2:
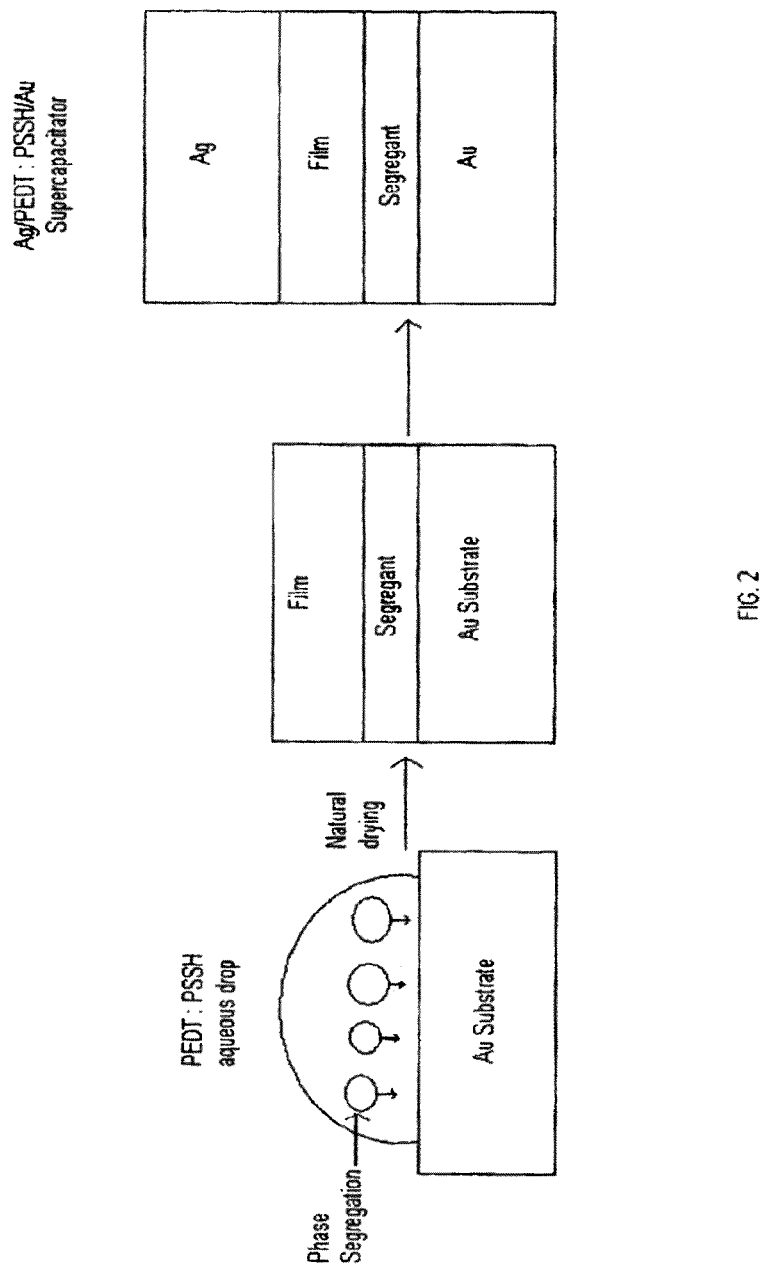
FIG. 2 is a schematic diagram illustrating a process of preparing a solid-state supercapacitor.

As shown in FIG. 2, an aqueous drop of PEDT:PSSH blend described above was cast onto a Au substrate and left to dry at ambient temperature. As a result, a PEDT:PSSH film and a PEDT:PSSH nanosegregant were formed, with the nanosegregant disposed between the Au substrate and the film. AFM images showed that the nanosegregant had an elongated structure, packed densely on the Au surface and having a length of 50-120 nm and a height of 1.5-3.8 nm. In contrast, surface profiling indicated that the film was much thicker, i.e., having a height of about 100 μm. Finally, Ag glue was pasted on the film, thus forming a Ag/PEDT:PSSH/Au supercapacitor.

Current-voltage (IV) curves were compiled from this supercapacitor by scanning the Au electrode voltage in the form of 0→8→0 V at different scan rates. The IV curves were characterized by strong hysteresis between the forward (0→8 V) and reverse (8→0 V) currents. The hysteresis depended on the voltage scan rate v; namely, the higher the v, the greater the hysteresis. This behavior is indicative of charge storage in the supercapacitor. By integrating the area $A_h$ (the active area of Ag electrode was ~1.0 mm$^2$) of the hysteresis and employing the equation $Q=A_h/v$, the typical amount of charges Q stored in the supercapacitor was estimated to be about 14.4 mC.

The supercapacitor was also charged by a constant current of 2.0 mA for 20 minutes with a charging voltage of 5.0-8.0 V applied to the Au electrode. It was then discharged to measure the power and the energy delivered by the supercapacitor. The fully charged supercapacitor showed a typical open-circuit voltage $V_{oc}$ of 1.85-2.2 V. Under a discharge current of 1.0 mA, the voltage of the supercapacitor dropped from 2.0 V to 0.02 V within 1.2 s. The discharge time increased to 1335 s when a much smaller discharge current of 0.001 mA was used. The discharge current was also detected with a constant resistance R connected with the supercapacitor. When R was 5.0 kΩ, the initial current was ~0.4 mA and the discharge completed in 9.2 s. When R was 1000 kΩ, the initial current was in the order of several μA and the discharge took ~2000 s.

A Ragone plot was constructed for the supercapacitor using data obtained in the constant current and resistance methods described above. The Ragone plot shows that the energy density was quite stable (~3.5 W·h/g) during the entire discharge period. The maximum power density was 11000 W/kg, comparable to that reported for electrolyte solution-based supercapacitors. See, e.g., B. E. Conway, *Electrochemical Supercapacitors: Scientific Fundamentals and Technological Applications*, Kluwer Academic/Plenum Publisher, New York, 1999; A. S. Arico, et. al, *Nature Mater.* 2005, 4, 366.

Table 2 below lists the capacitance C, output energy E, specific capacitance $C_m$, specific capacitance $C_s$, and energy density $E_m$ of the supercapacitor using the data obtained by the above-described constant current and resistance methods. The $C_m$, $C_s$, and $E_m$ were obtained by normalizing the C and E to the PEDT:PSSH film mass of the supercapacitor. The mass of the film was determined by peeling off the film and weighing it with a microbalance. It was about 0.1 mg for the film with an area of 1.0 mm$^2$. The $C_m$ and $E_m$ were about 6.5 F/g (or $C_s$ was 65 mF/cm$^2$) and 3.5 W·h/kg, respectively.

In addition, the fully charged supercapacitor was used as an energy source to power a digital thermometer (1.5 V, 0.06 mA) for durations of up to 60 s. As listed in Table 2, the energy delivered to the thermometer and the corresponding capacitances were in agreement with those obtained in constant current and constant resistance methods.

TABLE 2

| Method | C (mF) | E (mJ) | $C_m$ (F/g) | $C_s$ (mF/cm$^2$) | $E_m$ (W·h/kg) |
|---|---|---|---|---|---|
| Constant current | 0.65 | 1.30 | 6.5 | 65 | 3.5 |
| Constant resistance | 0.62 | 1.26 | 6.2 | 62 | 3.6 |
| Digital thermometer | 0.68 | 1.35 | 6.8 | 68 | 3.6 |

This supercapacitive behavior was found to depend on presence of water in the film. Some water remained in the film as the supercapacitor was prepared and measurement were performed both at ambient temperature. When the supercapacitor was placed in a vacuum chamber to remove absorbed water, it was found to lose the charge storage function; namely, the IV curve of the film showed no hysteresis. Only a negligible open circuit voltage ($V_{oc}$) of 0.3 V and a short circuit current ($I_{sc}$) of 0.2 μA were observed after fully charging the supercapacitor at 2.0 mA for 20 minutes. These results were in sharp contrast to a $V_{oc}$ of 1.89-2.2 V and a $I_{sc}$ of 0.8-3.0 mA as observed with the film having absorbed water.

The supercapacitive behavior was found to also depend on presence of a nanosegregant. In a control experiment, a thin layer (~20 nm) of PEDT:PSSH was first formed on a Au surface by fast drying the layer in vacuum for several minutes. No nanosegregant was formed as the drying process was too short. This was confirmed by lack of the superhydrophilicity of the surface covered by the thin layer. An aqueous drop of PEDT:PSSH blend was then cast on top of the thin layer to form a control film. The control film also did not contain a nanosegregant. IV curve compiled from the control film showed almost no hysteresis due to absence of a nanosegregant. After charging the supercapacitor at 2.0 mA for 20 minutes, a $V_{oc}$ of 0.30-0.40 V and a $I_{sc}$ of 0.1-1.0 μA were observed, indicating the lack of the supercapacitive behavior in the device containing the control layer and the control film.

In addition to Au, transparent fluorinated tin oxide (FTO) conducting glass and graphite were also used as the positive electrodes to prepare supercapacitors. Table 3 below lists the capacitance C, output energy E, specific capacitance $C_m$, $C_s$ and energy density $E_m$ of these three supercapacitors having different substrates.

TABLE 3

| Substrate | C (mF) | E (mJ) | $C_m$ (F/g) | $C_s$ (mF/cm$^2$) | $E_m$ (W·h/kg) |
|---|---|---|---|---|---|
| Au | 0.65 | 1.30 | 6.5 | 65 | 3.5 |
| FTO | 0.66 | 1.26 | 6.6 | 66 | 3.6 |
| Graphite | 0.68 | 1.28 | 6.8 | 68 | 3.6 |

Table 3 shows that $C_s$ was in a range of 65-68 mF/cm$^2$ and $E_m$ was about 3.5 W·h/kg for all three different supercapacitors, indicating that they had consistent supercapacitor performance.

More supercapacitors were made by the following method. Graphene powders or flakes were added into the PEDT:PSSH aqueous dispersion, this aqueous dispersion was then used to form a supercapacitor by the same method described above. This new supercapacitor showed an increase of energy storage capacity by 5-15%.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other examples are also within the claims.

What is claimed is:

1. A coated substrate comprising:
a coating that includes a water insoluble polymer and a water soluble polymer; and a substrate covered by the coating, wherein the water insoluble polymer is poly(3,4-ethelynedioxythiophene) ("PEDT"), and the water soluble polymer is poly(styrene sulfonic acid) ("PSSH"), the coated substrate is prepared by a method including the following steps:
providing an aqueous dispersion containing PEDT and PSSH,
applying the aqueous dispersion onto a surface of a substrate, and
allowing the applied aqueous dispersion to dry to form, due to different water affinities of the two polymers, on the surface of the substrate a nanosegregant having a thickness of 1-10 nm capable of capturing a water film having a thickness of 0.1-10 mm, wherein the nanosegregant includes a water-insoluble layer containing both PEDT and PSSH and a water-soluble layer also containing both PEDT and PSSH.

2. The coated substrate of claim 1, wherein the ratio between PEDT and PSSH is 1:2.5 to 1:20 by weight.

3. The coated substrate of claim 2, wherein the ratio between PEDT and PSSH is 1:6 by weight.

4. The coated substrate of claim 1, wherein the nanosegregant has a thickness of 1-5 nm.

5. The coated substrate of claim 1, wherein the nanosegregant has a water contact angle of 0-25°.

6. The coated substrate of claim 5, wherein the nanosegregant has a water contact angle of 5-20°.

7. The coated substrate of claim 1, wherein the nanosegregant captures a water film having a thickness of 0.5-3.0 mm.

8. The coated substrate of claim 1, wherein the nanosegregant has a thickness of 1-5 nm, a water contact angle of 5-20°, and the nanosegregant has a capability to capture a water film having a thickness of 0.5-3.0 mm.

9. A solid-state supercapacitor comprising:
a positive electrode;
a negative electrode;
a nanosegregant formed from an aqueous dispersion including a water insoluble polymer and an ionizable water soluble polymer due to different water affinity of the two polymers, the nanosegregant having a thickness of 1-10 nm; and
a conductive film including the water insoluble polymer and the water soluble polymer, the film having a thickness of 0.4-500 μm, wherein the nanosegregant is disposed between the positive electrode and the film, and the film is disposed between the negative electrode and the nanosegregant.

10. The solid-state supercapacitor of claim 9, wherein the water soluble polymer includes carboxylic groups or sulfonic groups.

11. The solid-state supercapacitor of claim 9, wherein the water insoluble polymer includes aniline groups or thiophene groups.

12. The solid-state supercapacitor of claim 11, wherein the water soluble polymer includes carboxylic groups or sulfonic groups.

13. The solid-state supercapacitor of claim 12, wherein the water insoluble polymer is poly(3,4-ethelynedioxythiophene) ("PEDT") and the water soluble polymer is poly(styrene sulfonic acid) ("PSSH").

14. The solid-state supercapacitor of claim 13, wherein the ratio between PEDT and PSSH is 1:2.5 to 1:20 by weight.

15. The solid-state supercapacitor of claim 14, wherein the ratio between PEDT and PSSH is 1:6 by weight.

16. The solid-state supercapacitor of claim 9, wherein the nanosegregant has a thickness of 1-5 nm, the film has a thickness of 0.4-500 μm.

17. The solid-state supercapacitor of claim 13, wherein the nanosegregant has a thickness of 1-5 nm, the film has a thickness of 0.4-500 μm.

18. The solid-state supercapacitor of claim 9, wherein the aqueous dispersion further includes a carbon-based nanomaterial that has a high surface area and a high electric conductivity.

19. The solid-state supercapacitor of claim 13, wherein the aqueous dispersion further includes a carbon-based nanomaterial that has a high surface area and a high electric conductivity.

20. The solid-state supercapacitor of claim 19, wherein the carbon-based nanomaterial is graphene.

* * * * *